(12) United States Patent
Michioka et al.

(10) Patent No.: US 8,070,360 B2
(45) Date of Patent: Dec. 6, 2011

(54) MOTION GUIDE DEVICE AND METHOD OF LUBRICATING THE SAME

(75) Inventors: Hidekazu Michioka, Tokyo (JP); Masahiko Yoshino, Tokyo (JP)

(73) Assignee: THK Co., Ltd., Tokyo (JP)

( * ) Notice: Subject to any disclaimer, the term of this patent is extended or adjusted under 35 U.S.C. 154(b) by 318 days.

(21) Appl. No.: 11/721,897

(22) PCT Filed: Oct. 31, 2005

(86) PCT No.: PCT/JP2005/019983
§ 371 (c)(1),
(2), (4) Date: Aug. 26, 2007

(87) PCT Pub. No.: WO2006/064614
PCT Pub. Date: Jun. 22, 2006

(65) Prior Publication Data
US 2009/0252442 A1    Oct. 8, 2009

(30) Foreign Application Priority Data

Dec. 17, 2004   (JP) .................................. 2004-366852

(51) Int. Cl.
*F16C 29/06*   (2006.01)
(52) U.S. Cl. ................. 384/13; 384/15; 384/45
(58) Field of Classification Search .......... 384/13, 384/15, 43–45, 468
See application file for complete search history.

(56) References Cited

U.S. PATENT DOCUMENTS

| | | | | |
|---|---|---|---|---|
| 3,612,629 A | * | 10/1971 | Granzow et al. | ............ 384/468 |
| 5,694,811 A | * | 12/1997 | Tsukada | .................. 384/43 |
| 6,510,614 B1 | | 1/2003 | Kato et al. | |
| 2004/0029740 A1 | | 2/2004 | Yatsushiro et al. | |
| 2005/0232520 A1 | * | 10/2005 | Yamazaki et al. | ............ 384/45 |

FOREIGN PATENT DOCUMENTS

CN   1461904 A   12/2003
(Continued)

OTHER PUBLICATIONS

International Search Report of PCT/JP2005/019983, date of mailing Jan. 24, 2006.

(Continued)

*Primary Examiner* — Thomas R Hannon
(74) *Attorney, Agent, or Firm* — Westerman, Hattori, Daniels & Adrian, LLP

(57) ABSTRACT

A motion guide device is provided, which is able to not only lubricate rolling-element rolling surfaces with the use of a technique totally different from conventional lubricating techniques but also maintain a lubricating capability over a long period of time. The motion guide device for use in the vacuum environment a track member (1) having a rolling-element rolling part (1*a*), a moving member (2) having a rolling-element circulation passage containing a loaded rolling-element rolling part (2*a*) facing the rolling-element rolling part (1*a*) and being movable relatively to the track member (2), a plurality of rolling elements (3) placed in along the rolling-element circulation passage, and a lubricant storing member storing lubricant, which member is attached to the moving member (2) without contacting the track member (1). The lubricant storing member is exposed in a space formed between the track member (1) and the moving member. The vaporized lubricant reaches the rolling-element rolling part (1*a*), loaded rolling-element rolling part (2*a*), and rolling elements (3), so that these parts and elements can be lubricated.

5 Claims, 11 Drawing Sheets

| FOREIGN PATENT DOCUMENTS | | |
|---|---|---|
| JP | 2-146217 U | 12/1990 |
| JP | 4-351399 A | 12/1992 |
| JP | 6-330951 A | 11/1994 |
| JP | 7-259864 A | 10/1995 |
| JP | 2001-165162 A | 6/2001 |
| JP | 2004-3545 A | 1/2004 |

OTHER PUBLICATIONS

Chinese Office Action dated Aug. 15, 2008, issued in corresponding Chinese Patent Application No. 200580042826.3.

* cited by examiner (B) SECTION ALONG B-B LINE (C) SECTION ALONG C-C LINE (D) DETAIL OF D PART

TRIANGULAR SHAPE

MOTION GUIDE DEVICE AND METHOD OF LUBRICATING THE SAME

TECHNICAL FIELD

The present invention relates to a motion guide device, such as a linear guide, ball spline, and ball screw, in which there are provided a track member, a moving member, and rolling elements, such as balls or rollers, interposed between the track member and the moving member, and a method of lubricating the motion guide device.

BACKGROUND ART

A motion guide device equipped with rolling elements, such as balls or rollers, is used to be arranged in guiding parts of a moving object moving linearly. While being used, the device has a guide function with the help of rolling movements of the rolling elements. For using this motion guide device, good lubricity should be given to the rolling elements and rolling-element rolling surfaces on which the rolling elements roll. If the device is used with no lubricity, wear of the rolling parts may increase or early flaking may be caused.

The applicant is proposing a lubricating technique (for example, refer to patent reference 1) which uses lubricating devices "QZ (trademark of THK Co., Ltd.)" attached to both ends of a moving member of a motion guide device, in which the lubricating devices are able to supply a small amount of lubricant to only rolling surfaces on which the rolling elements roll. Inside of each of the lubricating devices, there are provided a high oil-retaining storage for storing lubricant, a high-density storage for applying the lubricant to the rolling surfaces, and oil-amount adjusting plates for adjusting an amount of flow of lubricant being supplied from the high oil-retaining storage to the high-density storage. How to supply the lubricant is based, in principle, on the capillary action on which devices such as felt pens are produced. Use of this lubricating method enables a small amount of lubricant to be applied onto the rolling-element rolling surfaces, whereby the lubricating capability is held over a long period of time.
Patent reference 1: Japanese Patent Laid-open Publication No. 2004-3545

DISCLOSURE OF THE INVENTION

Problems to be Solved by the Invention

An object of the present invention is to provide a motion guide device and a method of lubricating the motion guide device which are able to lubricate the rolling-element rolling surfaces in a lubricating technique totally different from the conventional and keep the rubricating performance over a long period of time.

Means for Solving the Problem

The present invention will now be described below. In the followings, reference numerals appearing in the accompanying drawings are added to components in brackets for ease in understanding the present invention, but this is not intended that the present invention is limited to the modes shown in the drawings.

In order to solve the above problem, a first aspect of the invention provides a motion guide device comprising: a track member having a rolling-element rolling part; a moving member having a loaded rolling-element rolling part facing the rolling-element rolling part and being movable relative to the track member; a plurality of rolling elements disposed between the rolling-element rolling part and the loaded rolling-element rolling part; and a lubricant storing member disposed on the moving member without contacting track member, exposed in a clearance formed between the track member and the moving member, and formed to store therein lubricant, wherein vaporized lubricant reaches the rolling-element rolling part, the loaded rolling-element rolling part, and the rolling elements for lubrication thereof.

A second aspect of the invention is characterized in that the motion guide device further comprises a clearance seal disposed on the moving member to seal the clearance formed between the track member and the moving member, wherein the lubricant storing member is disposed within a sealed space enclosed by the track member, the moving member, and the clearance seal.

A third aspect of the invention is characterized in that the lubricant storing member is made up of bonded textile or porous material.

A fourth aspect of the invention is characterized in that the track member is a track rail having an upper surface and side surfaces, the moving member having a central part facing the upper surface of the track rail and stem parts facing the side surfaces respectively and being formed into a saddle shape as a whole, and the lubricant storing member is disposed between a lower surface of the central part of the moving member and the upper surface of the track member.

A fifth aspect of the invention is characterized in that the clearance seal comprises an end clearance seal disposed on an end of the moving member in a moving direction thereof without contacting the track member and a side clearance seal disposed on each of the stem parts of the moving member without contacting the track member and formed to extend from one end of the moving member to the other end of the moving member in the moving direction thereof.

A sixth aspect of the invention is characterized in that the motion guide device is used in a vacuum environment.

A seventh aspect of the invention solves the foregoing problem by a method of lubricating a motion guide device having rolling elements disposed between a rolling-element rolling part of a track member and a loaded rolling-element rolling part of a moving member moved relative to the track member, the method comprising: exposing a lubricant storing member for storing lubricant, in a clearance sealed between the moving member and the track member; and vaporizing the lubricant and allowing the lubricant to reach the rolling-element rolling part, the loaded rolling-element rolling part, and the rolling elements for lubrication thereof.

Effects of the Invention

According to the first aspect, the lubricant stored in the lubricant storing member is vaporized to reach the rolling elements and rolling-element rolling part, so that these components can be lubricated. Since the lubricant, which is liquid, is vaporized once, the lubricating capability can be held over a long period of time.

According to the second aspect, since the sealed space is filled with the vaporized lubricant, the rolling elements and the rolling-element rolling part can be lubricated in an effective manner and the lubricating capability can be held over a long period of time.

According to the third aspect, it is possible to store the lubricant in a state where the lubricant is vaporized easier.

According to the fourth aspect, the vaporized lubricant flows from the upper surface of the track member to the side surfaces thereof, thus allowing the rolling-element rolling part to be lubricated into every corner thereof.

According to the fifth aspect, a sealed space is formed around the lubricant storing member. In addition, the end clearance seal and side clearance seal have no contact with the track member, thereby resulting no dust due to the wear.

According to the sixth aspect, it is easier to vaporize the lubricant.

According to the seventh aspect, the lubricant stored in the lubricant storing member is vaporized to reach the rolling elements and rolling-element rolling part, whereby these components can be lubricated. Because the liquid lubricant is vaporized once, the lubricating capability is held over a long period of time.

BEST MODE FOR CARRYING OUT THE INVENTION

Figure 1:
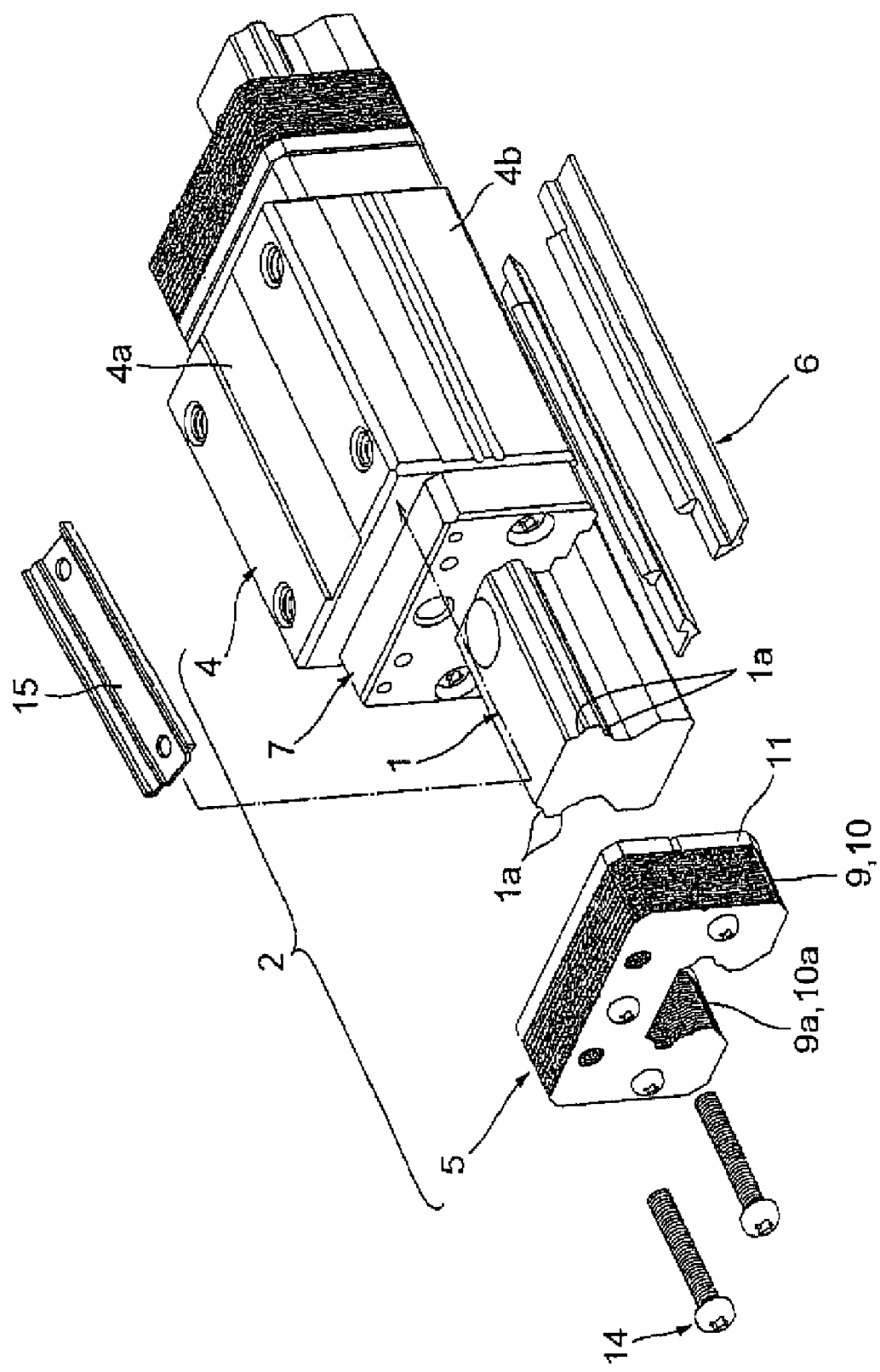
FIG. 1 is a perspective view of a motion guide device according to an embodiment of the present invention.
Figure 2:
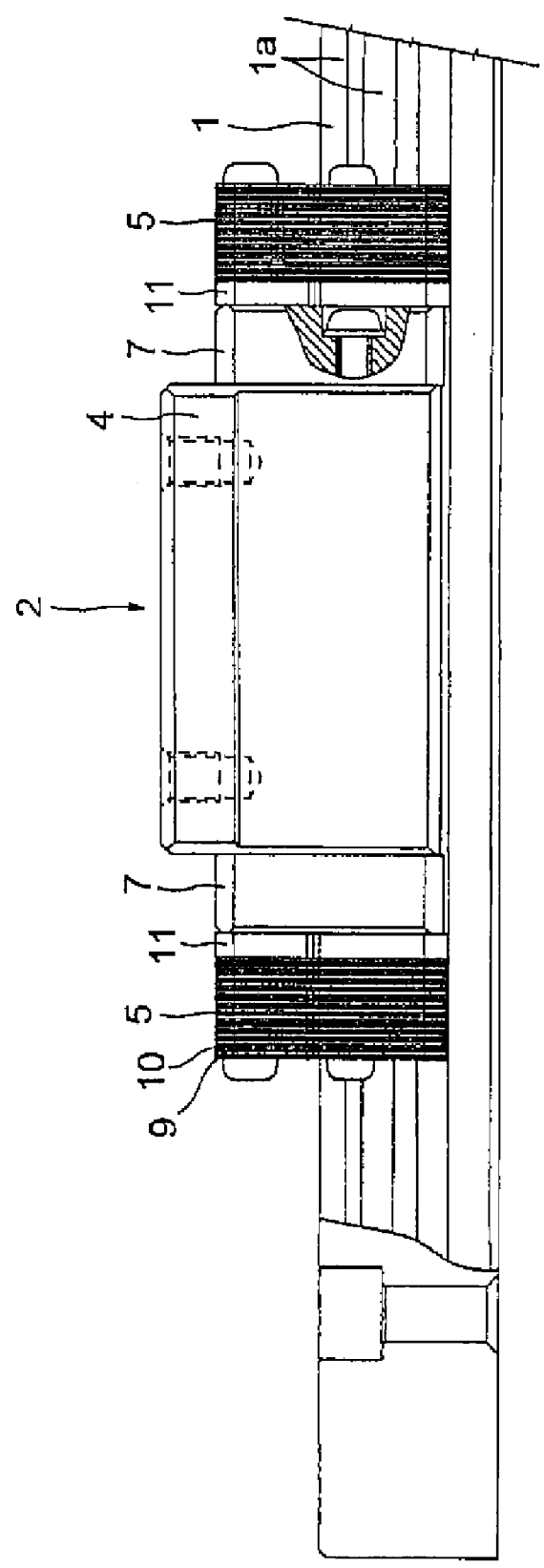
FIG. 2 is a side view of the motion guide device.
Figure 3:
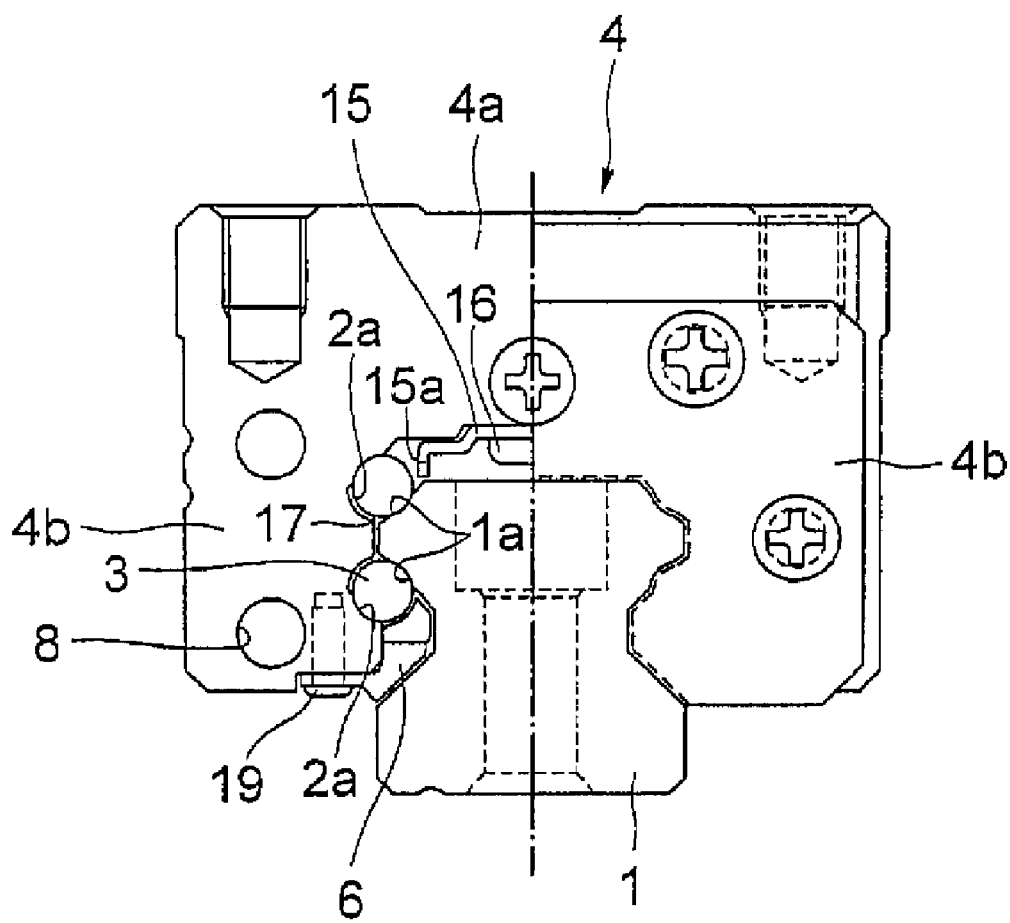
FIG. 3 is a frontal view (partly including a sectional view) of the motion guide device.

FIGS. 1 to 3 show a motion guide device employed in an embodiment according to the present invention.
FIG. 1 shows a perspective view of the motion guide device, FIG. 2 shows a side view thereof, and FIG. 3 shows the frontal view thereof (partly containing a sectional view). The motion guide device adopted by the present embodiment is called a linear guide and is provided with a track rail 1 serving as a track member extending linearly and a moving member 2 movably assembled with the track rail 1 with balls 3 interposed therebetween, the balls serving as a number of rolling elements.

The track rail 1 has right and left side surfaces on which ball rolling grooves 1a serving as rolling-element rolling parts are formed to extend along a longitudinal direction of the rail. Each of the ball rolling grooves 1a has an arch-shaped section that has a curvature radius slightly larger than the radius of each ball 3. In the present embodiment, on each of the right and left side surfaces of the track rail 1, the two ball rolling grooves 1a are formed at upper and lower parts, so that the four ball rolling groves 1a are formed on both side surfaces in total. Of course, the number of rails and positional arrangements are set to various modes depending on values of load applied to the device and some other factors.

The moving member 2 is composed of a moving block 4 and clearance seals 5 and 6 both attached to the moving block 4, in which the moving block 4 is formed to have a ball circulation passage including loaded ball rolling grooves 2a facing the ball rolling groves 1a, respectively. The clearance seals are classified into end clearance seals 5 respectively attached to both side faces of the moving block located in the moving directions thereof and side clearance seals 6 respectively attached to both side surfaces of the moving block.

As shown in FIG. 3, the moving block 4 is formed as a whole into a saddle shape and has a central part 4a to be opposed to the upper surface of the track rail 1 and stem parts 4b respectively extending downward from on both right and left sides of the central part 4a so as to face the right and left side surfaces of the track rail 1.

A plurality of balls 3 are interposed between each ball rolling groove 1a of the track rail 1 and each loaded ball rolling groove 2a of the moving block 4. The balls 3 which roll along a loaded ball rolling passage formed between each ball rolling groove 1a and each loaded ball rolling groove 2a is subject to pressurization. The balls 3 which have rolled and reached one end of the loaded ball rolling passage of the moving block 4 enters a U-shaped direction changing passage formed in each end plate 7 (refer to FIG. 1). After circulating the U-shaped direction changing passage, the balls enter a non-loaded ball return passage 8 (refer to FIG. 3) which extends in parallel to the loaded ball rolling passage. The balls 3, which have passed the non-loaded ball return passage 8, circulate the direction changing passage of an opposite-side end plate 7, and again enter the loaded ball rolling passage. A ball circulation passage is composed in a circuit form by a combination of the liner loaded ball rolling passage, the U-shaped direction changing passages, and the liner non-loaded ball return passage 8.

As shown in FIG. 3, between a lower surface of the central part 4a of the moving block 4 and an upper surface of the track rail, there is disposed a lubricant storing member 15 which store lubricant therein. The lubricant storing member 15 is secured to the lower surface of the central part 4a using linkage means such as screws 16. The lubricant storing member 15 is exposed in a space formed between the moving block 4 and the track rail 1. In the state where the moving block 4 is assembled with the track rail, the lubricant storing member 15 does not come into contact with the track rail 1 and the balls 3. Meanwhile, in the state where the moving block 4 is removed from the track rail 1, the balls 3 is retained between an edge portions 17 of each ball rolling groove 1a of the track rail 1 and each of end portions 15a of the lubricant storing member 15 so that the balls 3 are prevented from dropping off. Thus a distance between each end portion a of the lubricant storing member 15 and the edge portion 17 of each ball rolling groove 1a of the track rail 1 is set to be slightly narrower than the diameter of each of the balls 3.

Figure 4:
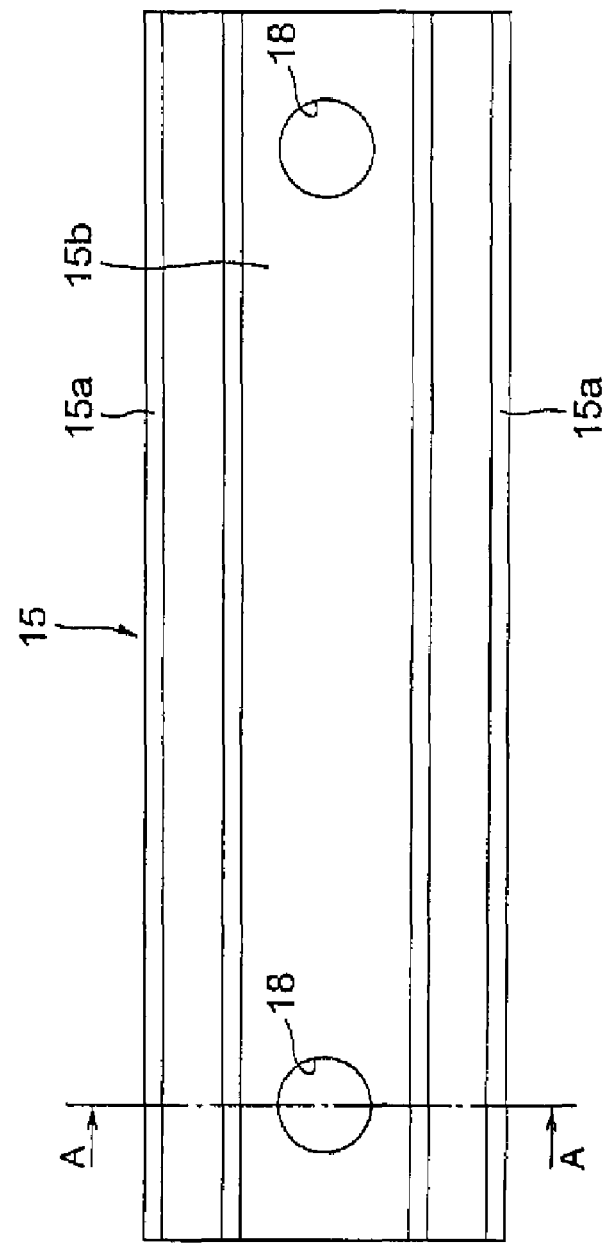
FIG. 4 is a detailed view of a lubricant storing member (, in which Figure (A) is a cross sectional view taken along a A-A line in Figure (B) and Figure (B) is a plan view).

FIG. 4 shows in detail the lubricant storing member 15. The lubricant storing member 15 is formed by bending and pressing, for example, a blade-shaped bonded textile along the shape of the lower surface of the central part 4a of the moving block 4. Both end portions 15a of the lubricant storing member 15 in the width direction thereof are bent toward the track rail 1 in order to prevent the balls 3 from dropping off, as described before. Through-holes 18 through which the screws 16 pass are formed through a central part 15b of the lubricant storing member 15, the central part 15b being located in the width direction of the member 15.

In the present embodiment, the lubricant storing member 15 is made up of bonded textile made of baked metal fiber of stainless steel. In addition, since the bonded textile made of metal fiber, by itself, is still short of strength, the member is formed by linking a layer of bonded textile to a reinforced layer such as mesh layer. The reason why the bonded textile of metal fiber is selected is that such a bonded textile is able to endure high temperatures and store large amounts of lubricant because its fiber-to-fiber void ratio is higher. If the high-temperature resistance is not required, it is allowed to select bonded textile of resin fabric (i.e., felt). Other than the bonded textile, porous materials produced by baking metal powder or by foaming formed materials may be used.

The voids among the fibers of the bonded textile are filled with the lubricant. As the lubricant, grease or oil for sliding surfaces is used. The grease is in a semisolid or solid state and produced by dispersing thickener into lubricant (base oil). Though the lubricant is in a solid state, the base oil itself is liquid, so that the base oil primarily contributes to the lubrication. Meanwhile the oil for the sliding surface is mineral oil or synthetic oil. The base oil of the liquid grease or the oil for the sliding surface is vaporized to allow the vaporized gas to reach and enclose the balls 3, ball rolling grooves 1a, and loaded ball rolling grooves 2a, with the result that those components are lubricated.

The lubricant storing member 15 is disposed within a closed space enclosed by the moving member 2, track rail 1, and clearance seals (composed of the end clearance seals 5 and side clearance seals 6) each sealing clearances formed between the moving member 2 and the track rail 1.

Figure 5:
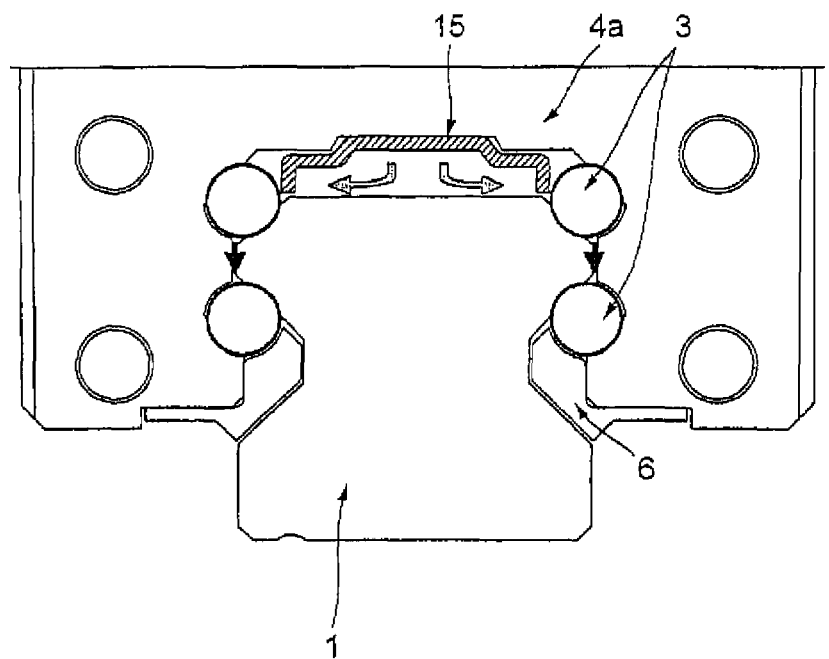
FIG. 5 is a view showing flows of vaporized lubricant within a closed space.

FIG. 5 shows how vaporized lubricant flows in the closed space. The motion guide device according to the present embodiment is used in a vacuum environment, practically in a space of which pressure is lower than the atmosphere. The vaporization of the lubricant is made easier in the vacuum environment. The vaporized lubricant is flowed out from the lubricant storing member 15 and fills in the closed space, And the vaporized lubricant is drifted around the ball rolling grooves 1a, balls 3, and loaded ball rolling grooves 2a such that these components are lubricated.

Each of the end clearance seals 5 is disposed on each end of the moving member 2 in the moving directions thereof without contacting the track rail 1 and each of the side clearance seals 6 is disposed on each of the stem parts 4b of the moving member 2 without contacting the track rail 1. The reason why the end clearance seals and the side clearance seals 6 are disposed not to come in contact with the rack rail 1 is to prevent dust due to the wear from being caused. The structures of both end and side clearance seals 5 and 6 will now be detailed by turns.

As shown in FIG. 1, to both end faces of the moving block 4 located in the movement directions thereof, the end clearance seals 5 are attached, respectively. Each end clearance seal 5 is composed of a plurality of first thin plates 9 and a plurality of second thin plates 10, which are stacked on one another in the alternate order between the first and second plates, and a holding plate 11 attached to each of the first and second plates 9 and 10. The end clearance seal 5 has openings 9a and 10a of which contours are in accord with the outer shape of the track rail 1.

As shown in FIG. 3, when viewed along the moving directions of the moving block 4, there is formed a considerable amount of clearance between the moving block 4 and the track rail. When the end plates 7 are attached to the block, there is also formed a clearance between the end plate 7 and the track rail 1. The end clearance seals 5 are disposed to make the clearance formed between each clearance seal 5 and the track rail 1 as smaller as possible.

Figure 6:
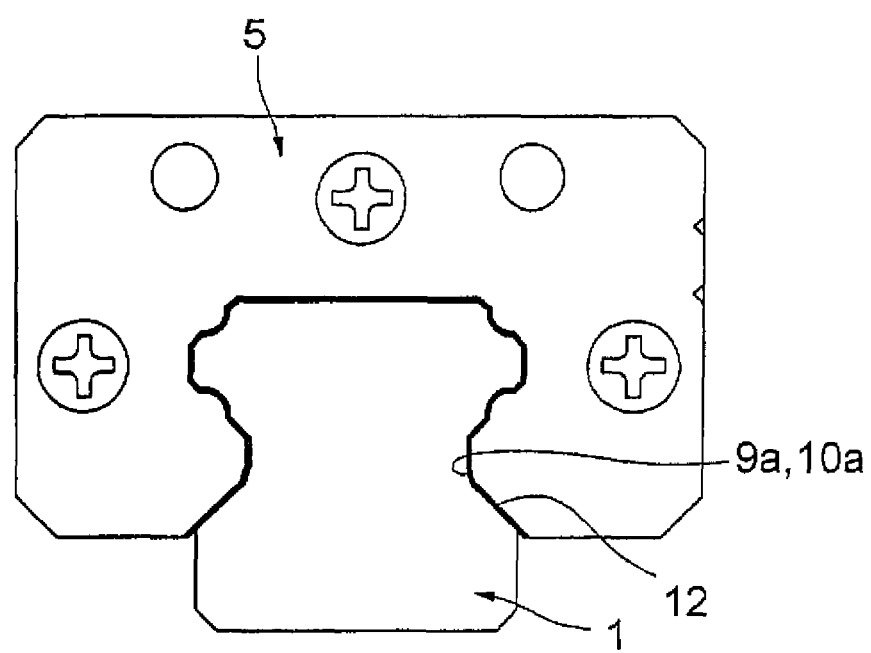
FIG. 6 is the frontal view of the motion guide device.

FIG. 6 shows the frontal view of the moving guiding device to which the end clearance seals 5 are attached. In each end clearance seal 5, there are formed the openings 9a and 10a respectively having a contour which is consistent with the outer shape of the track rail 1. The sizes of the openings 9a and 10a are larger than the outer shape of the track rail 1, thus forming a slight clearance 12 between each end clearance seal 5 and the track rail 1 so as to be located along the track rail 1. The end clearance seals 5 are allowed to move along the track rail 1 with a slight clearance kept therebetween, without contacting the track rail 1. The clearance 12 will detailed later.

Figure 7:
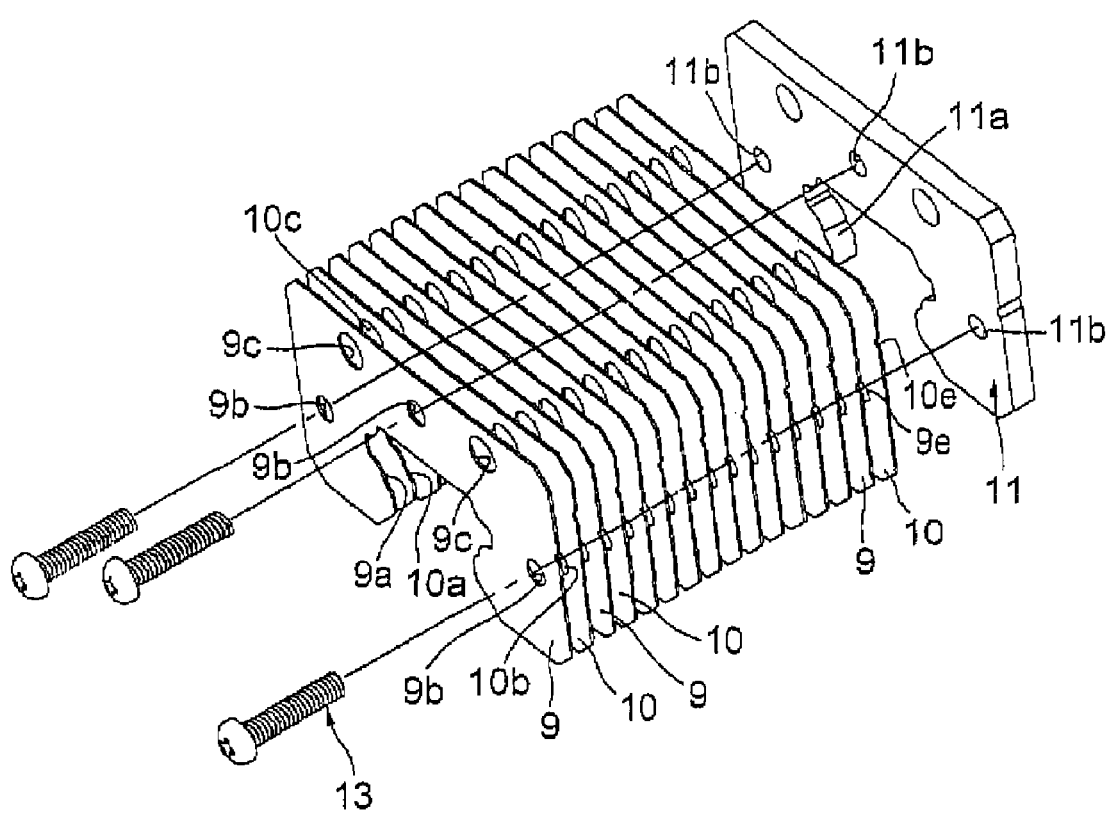
FIG. 7 is a perspective view showing an end clearance seal, which is shown in a disassembled state thereof.

FIG. 7 shows a perspective view of one of the end clearance seals 5. The first plates 9 are manufactured by stamping a thin metal plate such as stainless steel. Each of the first plates 9 is shaped into an approximately rectangular form and has a central part on a one side thereof, where the central part is formed to have an opening 9a of which shape is consistent with the contour of sections of the track rail 1. The shape of the opening 9a is slightly larger than the sectional contour of the track rail 1. Through-holes 9b allowing screws 13 or other securing elements to be passed therethrough for securing the first and second plates 9 and 10 to each holding plate 11 are formed through each of the first plates 9 at positions surrounding the opening 9a. Further, at both positions laterally neighboring the uppermost one of the through-holes 9b of the respective first plates, through-holes 9c are formed therethrough which allow screws 14 (refer to FIG. 1) or other securing elements to pass through for securing each end clearance seal 5 to the moving block 4. A triangular notch 9e is formed on a side of each of the first plates 9.

Each of the second plates 10 is also formed into an approximately rectangular form and has a central part on a one side thereof, where the central part is formed to have an opening 10a of which shape is consistent with the contour of sections of the track rail 1. Though detailed later, the openings 10a of the second plates 10 are slightly larger in contours than the openings 9a of the first plates 9. Accordingly, stacking the first and second plates 9 and 10 alternately one on another creates a concavo-convex shape along par of the opening portion. Around the opening 10a of each of the second plates 10, through-holes 10b allowing the screws 13 or other securing elements to pass therethrough are formed. The second plates 10 are also manufactured, for example, by stamping a thin metal plate such as stainless steel. On a side of each of the second plates 10, a triangular notch 10e is formed so as to be shifted from that of each of the first plates 9 in the longitudinal direction. The formation of the notches makes it possible that the first and second plates 9 and 10 are distinguished from each other, when viewing the appearance of each seal after assembling thereof.

In order that each of the end clearance seals 5 has a lot of concavo-convex shapes, it is desirable that the first and second plates 9 and 10 are made thinner. In contrast, when considering preventing deformations due to tightening the plates with the screws 13, it is preferred that the first and second plates 9 and 10 have a certain degree of thickness. In light of these mutually conflicting needs, the first and second plates 9 and 10 are produced to have a thickness of 0.2 mm or thereabouts, for instance. Of course, various thickness amounts other than the above may be available depending on factors including the size of the moving block 4.

The holding plate 11 is made thicker than the first and second plates 9 and 10. This holding plate 11 has also an opening 11a which is consistent in shape with the track rail 1. At positions around the opening 11a of the holding plate 11, female screw portions 11b are formed to be engageable with the screws 13. An assembling jig is used such that the first and second plates 9 and 10 and the holding plate 11 are pushed to this assembling jig for positioning, and the screws 13 are applied to combine those plates.

Figure 8:
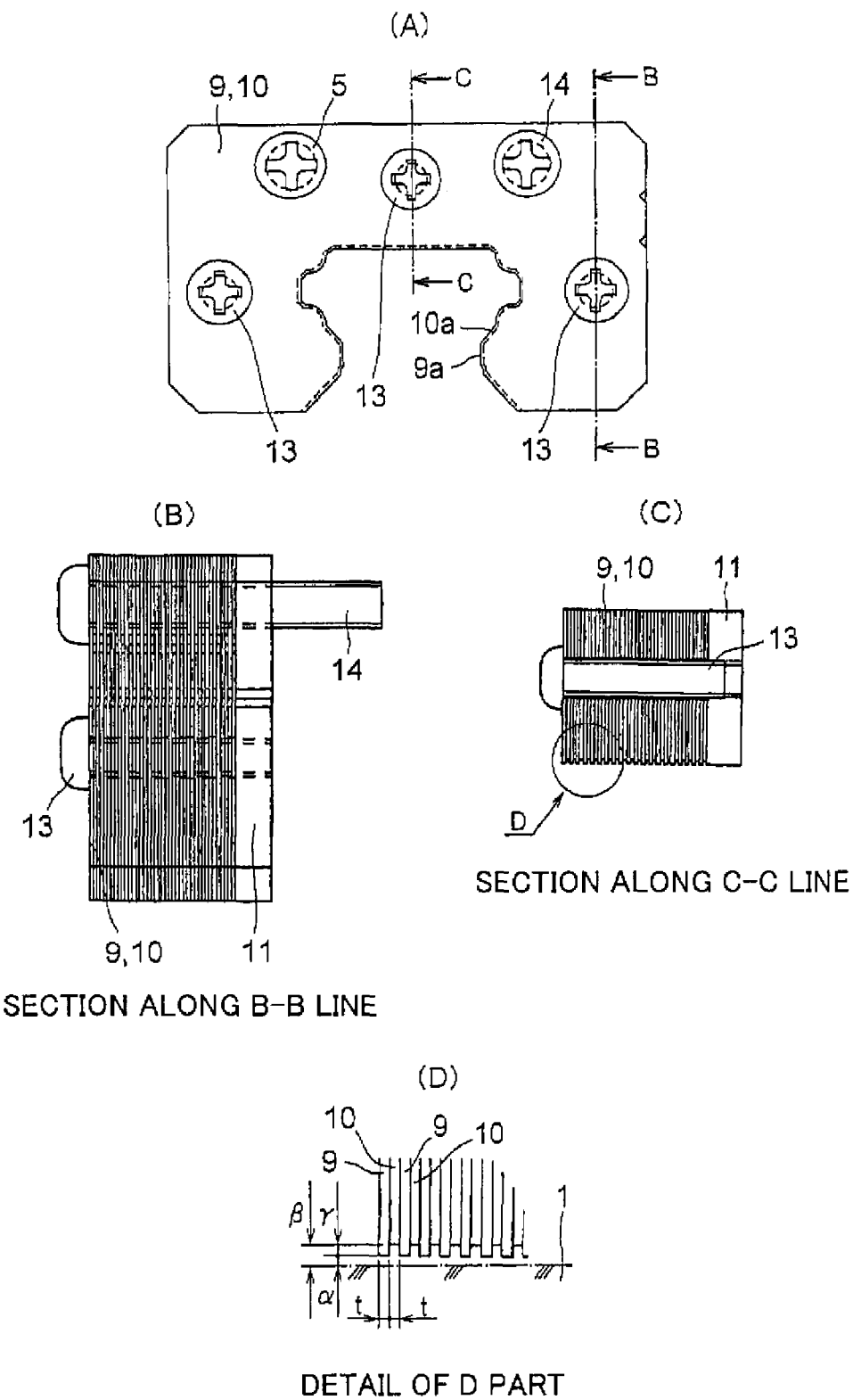
FIG. 8 is a view showing the stacked end clearance seal (, in which Figure (A) shows the frontal view, Figure (B) shows a sectional view taken along a B-B line in Figure (A), Figure (C) shows a sectional view taken along a C-C line in Figure (A), and Figure (D) shows a detailed view of a D part in Figure (C)).

FIG. 8 shows each of the end clearance seals 5 in which the plates are stacked on one another. As shown in FIG. 8(A), the opening 10a formed in each of the second plates 10 has a contour which is slightly larger than the contour of the opening 9a of each of the first plates 9. Thus, as shown in FIG. 8(C) and (D), the surface of the end clearance seal 5, which faces the track rail 1, is formed to have a concavo-convex shape. With the first and second plates 9 and 10 stacked on one another, a clearance $\beta$ formed between the second plates 10 and the track rail 1 is larger than a clearance $\alpha$ formed between the first plates 9 and the track rail 1.

Without stacking the plurality of first and second plates on one another, the concavo-convex shape can be formed on the end clearance seal 5, for example, by forming a plurality of grooves on a solid member. However, in this case, as the number of repeated concavo-convex patterns is increased, the process work becomes harder. If the problem to this process work is overcome, the plurality of grooves may be formed on the solid member.

In a state where each end clearance seal 5 is attached to the moving block 4, the clearance $\alpha$ between the first plates 9 and the track rail 1 is set to some 0.02 to 0.25 mm. The smaller this clearance $\alpha$, the larger the resistance caused when a gas flows through the passage (i.e., the evaporated lubricant is difficult to leak to the outside), so that it is preferred that a target value to the clearance $\alpha$ is set to some 0.05 to 0.06 mm or less than it. However, since the track rail 1 involves a tolerance in its processing, setting the clearance to a too small amount may cause a contact between the end clearance seals 5 and the track rail 1. Thus, in the present embodiment, in consideration of a tolerance to be given to the track rail 1, the clearance $\alpha$ is set to some 0.02 to 0.25 mm, preferably to some 0.05 to 0.15 mm.

In the present embodiment, a difference $\gamma$ in height (step) between the first plates 9 and the second plates 10 is s approximately equal to a thicknesses t of each of the first and second plates 9 and 10, and for example set to some 0.2 mm. The larger the difference $\gamma$ between the heights, the larger a contact area of the plates. And resistance caused by the gas flowing through the passage increase. Of course the thickness t and the difference $\gamma$ both will not be limited to 0.2 mm, but may be set to other appropriate values, such as 0.1 mm, 0.3 mm, or others.

The end clearance seals 5 are able to move without touching the track rail 1. The clearance 12 formed between the inner surfaces of the end clearance seals 5 and the track rail 1 is made as smaller as possible and the surface of each of the end clearance seals 5, which faces the track rail 1, is formed into a concavo-convex shaped surface. Hence, when the evaporated lubricant flows along the passage formed between the end clearance seals 5 and the track rail 1, a large amount of resistance is caused against the gas flow. Therefore the sealed space is filled with the vaporized lubricant.

Incidentally, in the present embodiment, to prevent dust from being caused due to the wear, the end clearance seals 5 are disposed not to come into contact with the track rail 1. If a small amount of dust is allowed to be caused, the end clearance seals 5 are made of elastic materials such as rubber and may be disposed so that the end clearance seals 5 come in contact with the track rail 1. In cases where the end clearance seals 5 are disposed to contact the track rail 1, the closed space comes closer to completeness as to its sealing action.

Figure 9:
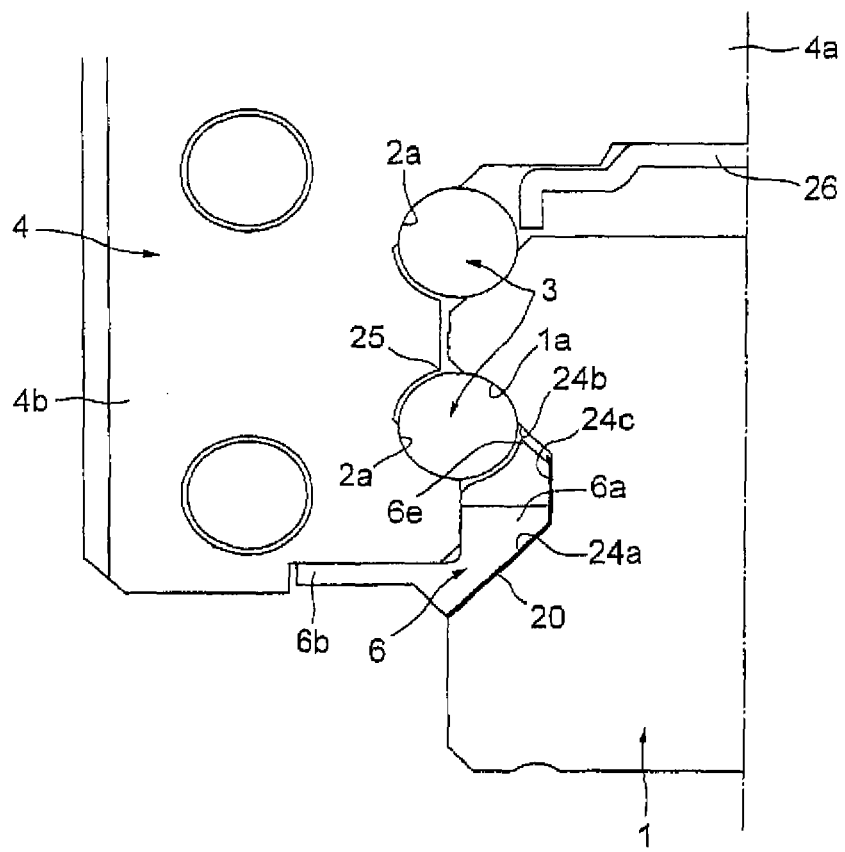
FIG. 9 is a frontal view of a side clearance seal attached to a moving block.
Figure 10:
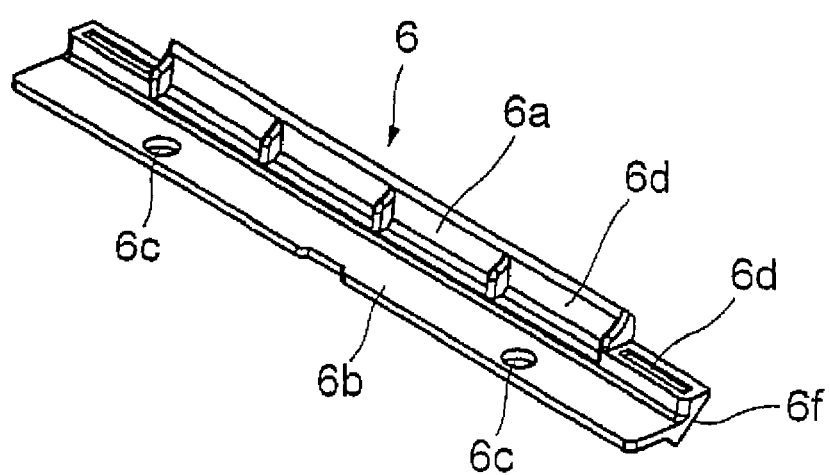
FIG. 10 is a perspective view showing the side clearance seal.

FIGS. 9 and 10 show one of the side clearance seals 6 attached to the moving block 4. The moving block 4 is formed into a saddle shape as a whole and has the central part 4a facing the upper surface of the track rail 1 and the stem parts 4b respectively facing the side surfaces of the track rail 1. To the lower end portion of each of the stem parts 4b, each of the side clearance seals 6 is attached. Each side clearance seal 6 is made to be elongated in the moving directions of the moving block 4 and has both ends each coming in contact with each of the end clearance seals secured to the moving block. Hence the clearance between the moving block 4 and the track rail 1 is surrounded by combined components composed of a pair of end clearance seals 5 disposed on both ends of the moving block 4 and a pair of side clearance seals located on the side surfaces of the moving block.

Each side clearance seal 6 comprises a flat plate portion 6b used to attach this side clearance seal 6 to the moving block 4 and a protruding portion 6a directed to protrude toward the track rail 1 to narrow a gap between the side clearance seal 6 and the track rail 1. Through the flat plate portion 6b, through-holes 6c are formed which allow securing means such as screws 19 or others (refer to FIG. 3) to attach the side clearance seal 6 to the moving block. The protruding portion 6a is formed to have a surface which is formed to not only be consistent in shape with each side surface of the track rail 1 but also keep a slight clearance 20 between the track rail 1 and the protruding portion 6a.

Figure 11:
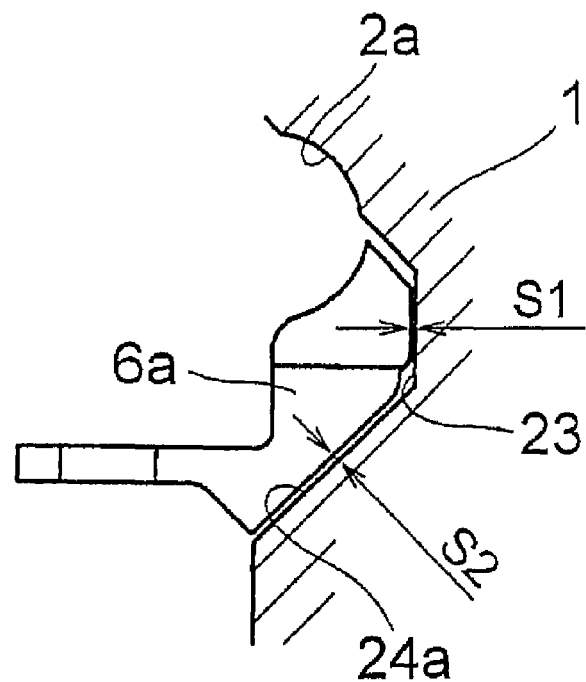
FIG. 11 is a view showing the size of a clearance formed between the side clearance seal and a track rail.

To be more specific, as shown in FIG. 9, the track rail 1 has both side surfaces on each of which a groove consisting of a bottom portion 24c and side wall portions 24a and 24b is formed. One side wall 24b, the lower ball rolling groove 1a is formed. The protruding portion 6a is located to approach the bottom portion 24c and side wall portion 24a of the groove. As shown in FIG. 11, a clearance S1 formed between the protruding portion 6a and the bottom portion 24c is smaller than a clearance S2 between the protruding portion 6a and the side wall portion 24a. The reason is that, in the track rail 1, the tolerance given to the bottom portion 24c is set to a value smaller than the tolerance given to the side wall portion 24a. In this way, in the track rail 1, compared to portions whose tolerances are larger, portions whose tolerances are smaller are allowed to have smaller clearances. The clearances S1 and S2 are set to, for example, 0.02 to 0.25 mm, preferably 0.05 to 0.15 mm, in a similar manner to the foregoing case for the end clearance seals 5.

The side clearance seals 6 may be made of resin materials or metal materials. In the present embodiment, the protruding portion 6a has a surface 6f to be opposed to the track rail 1 and the surface 6f is formed to be flat, not a concavo-convex shape. In a case where the side clearance seals 6 are made of resin, there is formed a thickness-cut portion 6d at parts other than a surface 6f of the protruding portion 6a facing the track rail 1, as shown in FIG. 10, in which the thickness-cut portion makes a resin thickness approximately constant at each part of each of the side clearance seals. If the same resin-made seal is formed to have thicker parts and thinner parts, the dimensions of the side clearance seal 6 are changed due to shrink mark of the resin. Arranging the thickness-cut portion 6d makes it possible to prevent the side clearance seal 6 from being changed in its dimensions.

The side clearance seals 6 attached to the moving block 4 are movable with no contact with the tack rail 1. A clearance 20 formed between the side clearance seals 6 and the track rail 1 is made as small as possible. Hence when the evaporated lubricant flows in a passage 23 between each side clearance seal 6 and the track rail 1 downward along the track rail 1, the flow undergoes a large amount of resistance.

The side clearance seals 6 also functions so as to prevent the balls from falling from the moving block 4, when the moving block 4 is removed from the tack rail 1. In order to give this function, a distance between an upper end part 6e of the side clearance seal 6 and an upper end part 25 of the loaded ball rolling groove 2a is designed to be smaller the diameter of each ball 3, as shown in FIG. 9.

Incidentally, in the present embodiment, to prevent dust from being caused due to the wear, the side clearance seals 6 are disposed not to come into contact with the track rail 1. If a small amount of dust is allowed to be caused, the side clearance seals 6 are made of elastic materials such as rubber and may be disposed so that the side clearance seals 5 come in contact with the track rail 1. In cases where the side clearance seals 6 are disposed to contact the track rail 1, the closed space comes closer to completeness as to its sealing action.

Figure 12:
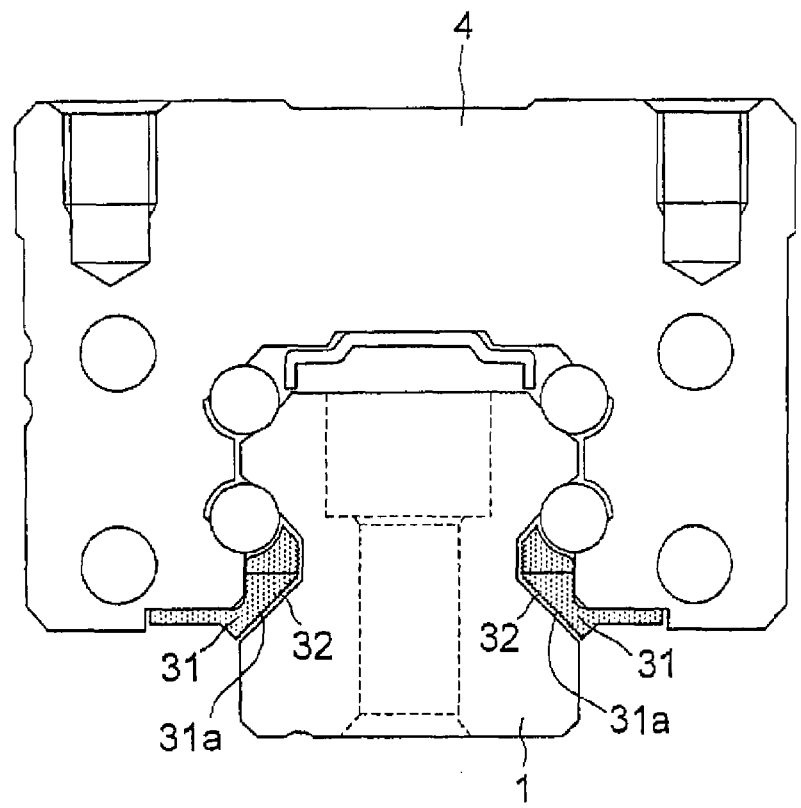
FIG. 12 is a view exemplifying another side clearance seal (in which the seal is attached to the moving block).
Figure 13:
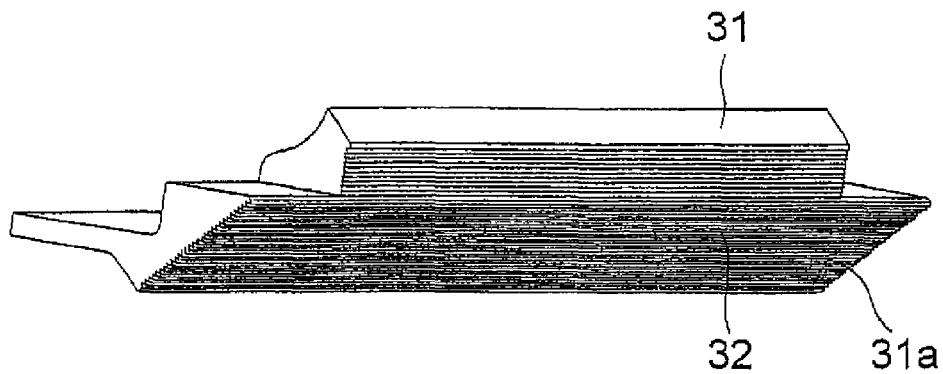
FIG. 13 is a perspective view exemplifying another side clearance seal.
Figure 14:
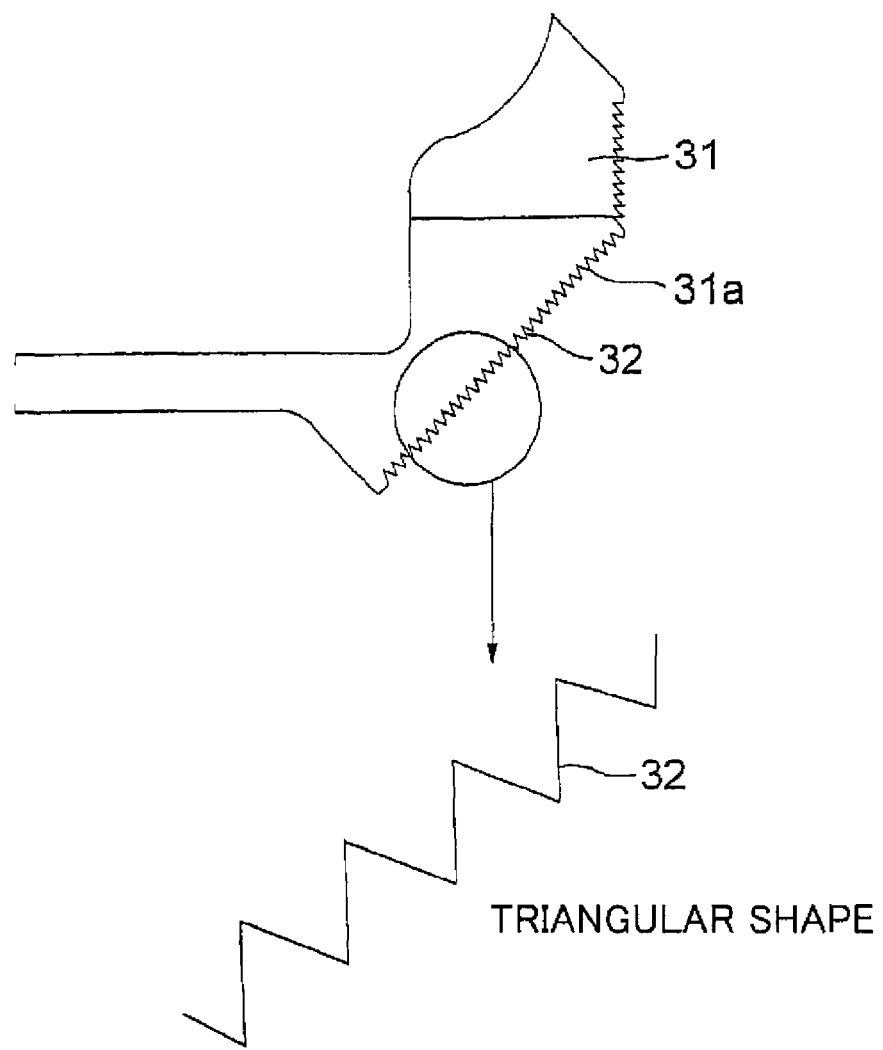
FIG. 14 is a frontal view exemplifying another side clearance seal (partly containing an enlarged view thereof).

FIGS. 12-14 show another example of the side clearance seals. Each of side clearance seals 31 according to this example has a surface 31a facing the track rail 1 on which grooves 32 are formed to provide a concavo-convex shape on the surface 31a. As shown in FIG. 13, the grooves 32 are formed to extend in parallel with the directions along which the side clearance seal 31 extend (i.e., the moving directions of the moving block 4). As shown in FIG. 14, the grooves 32 represent a triangular sectional form with plural triangles. This side clearance seal 31 is identical to the side clearance seal 6 illustrated in FIG. 10 in that the seal 31 has the flat plate portion and the protruding portion as well as the ball retaining function.

In this side clearance seal according to this example, compared to the flat surface, the concavo-convex shape of the surface will cause a larger amount of resistance against a gas flowing along the passage between the side clearance seals 31 and the track rail 1.

Figure 15:
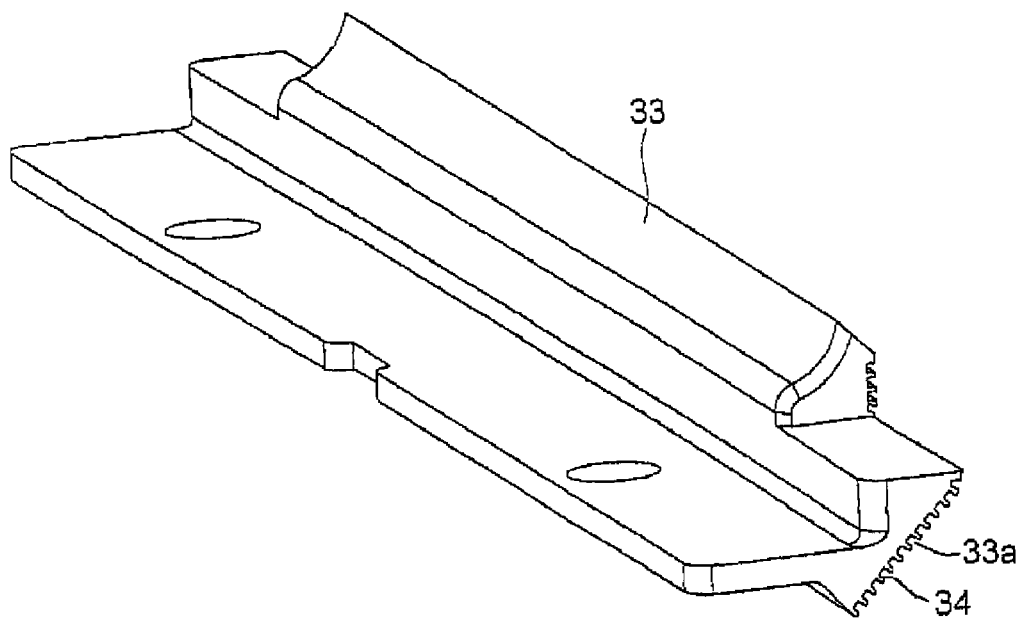
FIG. 15 is a perspective view exemplifying another side clearance seal.
Figure 16:
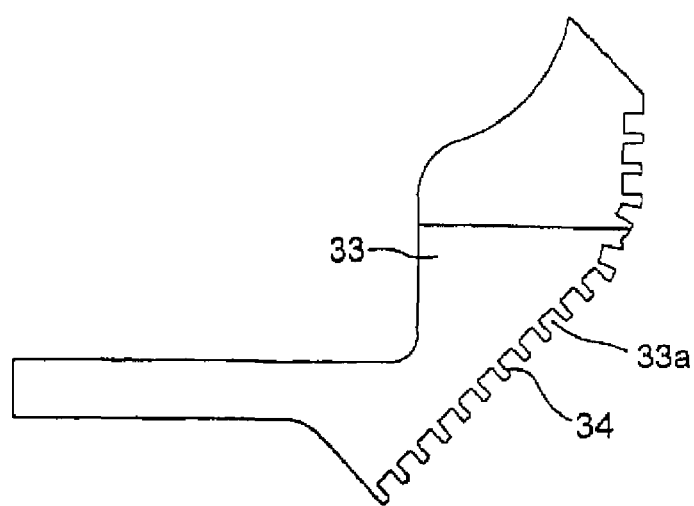
FIG. 16 is a frontal view exemplifying another side clearance seal.

FIGS. 15 and 16 show another example of the side clearance seal. This example provides a side clearance seal 33 comprising a surface 33a facing the track rail 1, in which the surface is formed to have grooves 34 of which sectional form is composed of a series of quadrangles. That is, as shown in this example, the sectional form of the grooves 34 may be quadrangular.

By the way, the present invention will not be limited to the structures embodied by the foregoing embodiment (s), and may be modified into various other modes without departing from the gist of the present invention. For example, a manual grease-feeding technique and/or a QZ lubricating technique may be used together with the foregoing gas lubricating technique. The manual grease-feeding technique is a technique in which a grease nipple is mounted to the motion guide device and a grease gun is used to allow the grease nipple to feed the grease to the balls. Further, the QZ lubricating technique is a lubricating technique based, in principle, on the capillary action on which devices such as felt pens are produced. Parallel use of these lubricating technique and gas lubricating technique results in that the lubricating capability is held over a longer period of time.

Further, in the present embodiment, the motion guide device is used in the vacuum environment to make it easier to vaporize the lubricant. However the motion guide device is not limited to the use in the vacuum environment, but may be used in any environment as long as the lubricant can be vaporized under the atmospheric pressure.

Furthermore, the motion guide device in accordance with the present invention can be applied to various other devices such as ball splines and ball screws, other than the linear guide. If being applied to a ball spline, the track member is formed as a cylindrical track shaft and the moving member is formed as a cylindrical outer tube which is fit with the track shaft. Moreover, if being applied to a ball screw, the track member is realized as a screw shaft and the moving member is realized as a nut which is fit with the screw shaft. In addition, concerning with the rolling elements, rollers may be used instead of the balls.

The present specification is based on Japanese Patent Application No. 2004-366852 filed on Dec. 17, 2004, the entire contents of which are expressly incorporated by reference herein.

The invention claimed is:

1. A motion guide device for a vacuum environment, characterized in that the device comprises:
   a track member having a rolling-element rolling part;
   a moving member having a loaded rolling-element rolling part facing the rolling-element rolling part and being movable relative to the track member;
   a plurality of rolling elements disposed between the rolling-element rolling part and the loaded rolling-element rolling part;
   a lubricant storing member disposed on the moving member without contacting the track member, exposed in a clearance formed between the track member and the moving member, and formed to store therein lubricant; and
   a clearance seal disposed on the moving member to seal the clearance formed between the track member and the moving member without contacting the track member,
   wherein, in the vacuum environment of pressure lower than atmospheric pressure, vaporized lubricant reaches the rolling-element rolling part, the loaded rolling-element rolling part, and the rolling elements for lubrication thereof,
   the lubricant storing member is made up of bonded textile or porous material produced by baking metal powder or by foaming formed materials of which voids are filled with the lubricant, and
   the lubricant storing member is disposed within a sealed space enclosed by the track member, the moving member, and the clearance seal.

2. The motion guide device of claim 1, characterized in that the track member is a track rail having an upper surface and side surfaces,
   the moving member having a central part facing the upper surface of the track rail and stem parts facing the side surfaces respectively and being formed into a saddle shape as a whole, and
   the lubricant storing member is disposed between a lower surface of the central part of the moving member and the upper surface of the track member.

3. The motion guide device of claim 2, characterized in that the clearance seal comprises
   an end clearance seal disposed on an end of the moving member in a moving direction thereof without contacting the track member and
   a side clearance seal disposed on each of the stem parts of the moving member without contacting the track member and formed to extend from one end of the moving member to the other end of the moving member in the moving direction thereof.

4. The motion guide device of claim 1, characterized in that the track member is a track rail having an upper surface and side surfaces, the moving member has a central part facing the upper surface of the track rail and stem parts facing the side surfaces respectively and is formed into a saddle shape as a whole, and the lubricant storing member is disposed between a lower surface of the central part of the moving member and the upper surface of the track member.

5. A method of lubricating a motion guide device for a vacuum environment having rolling elements disposed between a rolling-element rolling part of a track member and a loaded rolling-element rolling part of a moving member movable relative to the track member and a clearance seal disposed on the moving member to seal the clearance formed between the track member and the moving member without contacting the track member, the method comprising:

exposing a lubricant storing member for storing lubricant, in a clearance sealed between the moving member and the track member, the lubricant storing member being made up of bonded textile or porous material produced by baking metal powder or by foaming formed materials of which voids are filled with the lubricant, and the lubricant storing member being disposed with a sealed space enclosed by the track member, the moving member, and the clearance seal; and in the vacuum environment of pressure lower than atmospheric pressure, vaporizing the lubricant and allowing the lubricant to reach the rolling-element rolling part, the loaded rolling-element rolling part and the rolling elements for lubrication thereof.

* * * * *